United States Patent [19]

Buckman et al.

[11] 3,976,495

[45] Aug. 24, 1976

[54] METHODS OF INHIBITING THE GROWTH AND PROLIFERATION OF FUNGI USING 3',5'-DIHALO-4'-HYDROXYACETOPHENONE

[75] Inventors: Stanley J. Buckman; Joseph G. E. Fenyes; John D. Pera; Lester A. Wienert, all of Memphis, Tenn.

[73] Assignee: Buckman Laboratories, Inc., Memphis, Tenn.

[22] Filed: July 10, 1974

[21] Appl. No.: 487,095

[52] U.S. Cl. .................................. 106/15 R; 106/16; 106/17; 106/18; 260/45.95 F; 424/174

[51] Int. Cl.² ........................................... C09D 5/14

[58] Field of Search ................... 106/15 AR, 16–18; 260/45.95 F; 424/174

[56] References Cited

UNITED STATES PATENTS

| | | | |
|---|---|---|---|
| 3,193,448 | 7/1965 | Buckman et al. | 424/174 |
| 3,719,509 | 3/1973 | Buckman et al. | 106/15 FP |

*Primary Examiner*—Joan E. Welcome
*Attorney, Agent, or Firm*—Floyd Trimble

[57] ABSTRACT

The preparation of 3',5'-dihalo-4'-hydroxyacetophenones and their use as fungicides are described.

60 Claims, No Drawings

METHODS OF INHIBITING THE GROWTH AND PROLIFERATION OF FUNGI USING 3',5'-DIHALO-4'-HYDROXYACETOPHENONE

This invention relates to methods whereby the resistance of organic substances susceptible to deterioration by the action of fungi is increased. More particularly, the products of this invention, 3',5'-dihalo-4'-hydroxyacetophenones, are useful for the control of fungi in industrial processes in which the growth and proliferation of such fungi interfere in the process itself or affect the quality or character of the resulting product.

Many industrial products, both during the process of manufacture and as the finished product, are normally susceptible to fungal degradation, if means are not taken to inhibit such degradation. Paint, paint films, plastics, wood pulp, starch and proteinaceous substances, animal hides, vegetable tanning liquors, and leather are all damaged or degraded by the growth of fungi or by enzymes produced by such growth. Wet pulp containing more than about 30 percent moisture content is subject to attack by stain, mold, and decay fungi. If not controlled, the result is a loss of useful fiber in badly decayed pulp, a darkening in color, and the development of undesirable odors caused by the growth and proliferation of fungi. We have found that 3',5'-dihalo-4'-hydroxyacetophenones, particularly the dibromo and dichloro compounds, are effective fungicides. In addition, our work has demonstrated that all of the dihalosubstituted acetophenones wherein the hydroxy group is in the ortho position are much less effective as fungicides.

The preferred substituted acetophenones of our invention, 3',5'-dibromo- and 3',5'-dichloro-4'-hydroxyacetophenone, are useful in inhibiting the growth of fungi that cause degradation of paint and disfigurement of paint films. Paints, especially water-thinned paints, are subject to fungal degradation when stored in cans. We have found that 3',5'-dibromo- and 3',5'-dichloro-4'-hydroxyacetophenones are excellent fungicides for use in preserving such paints under storage conditions. Films deposited from either water-thinned or solvent-thinned paints are subject to disfiguration, much of which has been proved to be the result of the growth of molds on the films and the accumulation of dirt which is partially or completely entrained and held on the surface of the films by the growth structure of the molds, and which is referred to herein as associated dirt. A number of different types of organomercurials, such as those disclosed in U.S. Pat. No. 2,097,339, and chlorinated phenols, as well as many other mold-inhibiting agents or preservatives, have been suggested and tried in paints. Many of these compounds are exceedingly toxic to molds in conventional laboratory test media and some have demonstrated effectiveness in other applications, such as in agricultural sprays, but they have proved to be surprisingly ineffective when they are incorporated in films from either water-thinned or solvent-thinned paints. We have found that films deposited from either solvent-thinned or water-thinned paint compositions having incorporated therein 3',5'-dibromo- or 3',5'-dichloro-4'-hydroxyacetophenone as a fungicide show great resistance to fungi causing the disfigurement and deterioration of such films. Furthermore, this property is retained by the paint film even after prolonged exposure.

We have also found that 3',5'-dibromo- and 3',5'-dichloro-4'-hydroxyacetophenones are useful in inhibiting the growth of fungi that cause the degradation of wood chips, wet lap or sheet pulp, and mulch paper. They are also useful in providing mold resistance to coated and uncoated paper and paperboard. Somewhat more specifically, 3',5'-dibromo- or 3',5'-dichloro-4'-hydroxyacetophenones when used as chip preservatives markedly limit the losses in wood substance, discoloration or wood, and losses in pulp quality that often result during long-term storage of wood chips. Other specific applications where these fungicides are useful in the wood industry are for sap stain control of green lumber and for stain control of wooden sashes and doors. Used as a preservative for wet lap or sheet pulp, they help prevent microbiological deterioration that often occurs when moist pulp must be stored for substantial periods of time or transported over long distances. Preservation of agricultural mulch paper with these compounds is useful when this paper is used in locations where fungal deterioration is too rapid. Mold resistance helps prevent discoloration, odors, and degradation of paper and paperboard employed in moist environments, including grades such as soap wrap, air-filter frames, wallpaper base stock, and building papers, paperboards, and wood.

It is well known by those skilled in the art that different species of molds are encountered at various stages in the manufacture of leather. As an example, soaking provides an environment highly conducive to the growth of microorganisms, and even strong pickle solutions are subject to attack by some microorganisms. Molds in particular may be troublesome and cause discoloration of the pickled stock, especially if it is held for a period of time. During the chrome-tanning process, the chrome-tanned stock held "in the blue" readily molds and become discolored with the result that additional cleaning is required. Severe mold growth at this stage will usually cause permanently discolored areas that influence subsequent finishing operations and reduce the value of the leather. Mold growth may develop on heavy vegetable tanned leathers during the drying period and produce spots and stains on either the flesh or grain sides.

We have found that 3',5'-dibromo- and 3',5'-dichloro-4'-hydroxyacetophenones can be employed in several stages of leather processing, including pickling, tanning, and fatliquoring, to inhibit the growth of fungi or molds that cause the spoilage of processing solutions and damage to skins, hides, and finished leather. They are especially useful for the protection of chrome-tanned stock held "in the blue".

In summation, when 3',5'-dibromo- or 3',5'-dichloro-4'-hydroxyacetophenone is used in tanning processes, they prevent leather damage and consequent losses caused by fungi, and, at the same time, help in obtaining desirable leather qualities such as greater flexibility and stretch, increased bulking, lighter color, and more uniform dyeing.

It is well known that many polymeric organic materials and polymeric organic coating compositions are susceptible to fungal degradation if adequate means are not taken to inhibit the growth and proliferation of fungi in or on the surfaces of such polymeric products. We have now found that 3',5'-dibromo- and 3',5'-dichloro-4'-hydroxyacetophenones are ideal fungicides for use with these polymeric products. Polymeric organic compositions which can be protected from the degrading effects caused by the growth of fungi include alkyd resins as disclosed in U.S. Pat. Nos. 1,847,783, 1,860,164, 1,950,468, and 2,087,852; epoxy resins as disclosed in U.S. Pat. Nos. 2,886,473; polyester resins; polyurethane; polyvinyl chloride resins; cellulosic and acrylic polymers; industrial coating including decorative and protective coatings wherein one or more of the components thereof comprises an organic composition susceptible to fungal degradation; and coated fabrics such as fabric coated with polyvinyl chloride, polyolefins and polyvinyl monofilaments.

Other applications for which the fungicides 3',5'-dibromo- and 3',5'-dichloro-4'-hydroxyacetophenones may be effectively used are in textiles such as tents, tarpaulins, rug and wall backings and so forth, cosmetic preparations, household fungicide preparations, and in agriculture. When used in agriculture, the compounds 3',5'-dibromo- and 3',5'-dichloro-4'-hydroxyacetophenones are used as seed, plant, and soil fungicides for protecting seeds, seedlings emerging from seeds, and plants against attack by fungi. The rate of application may also vary with the fungicidal use intended.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing advantages are attained by incorporating into an organic compound susceptible to deterioration by the growth and proliferation of fungi in or on the surface of the organic compound an effective amount of 3',5'-dibromo- or 3',5'-dichloro-4'-hydroxyacetophenone.

As to the amount of 3',5'-dibromo- or 3',5'-dichloro-4'-hydroxyacetophenone to be added to the system, suitable and preferred quantities vary according to the specific system in which the fungicide is used. When added to an aqueous system, suitable and preferred quantities vary from 100 to 10,000 parts and 200 to 5,000 parts, respectively, per million parts of moisture-free organic material. In paint compositions, suitable and preferred quanitities on a weight basis vary from 0.5 to 8 percent and 1 to 5 percent, respectively, based on the total weight of the paint composition. It will be understood, of course, that larger quantities of 3',5'-dibromo- or 3',5'-dichloro-4'-hydroxyacetophenone may be used with no detrimental effect, but such larger quantities increase the cost of operation with limited material benefit.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Preparation of 3',5'-dichloro-4'-hydroxyacetophenone

Into a 5-liter, round bottom, four-neck flask, fitted with a condenser, mechanical stirrer, gas bubbler, and thermometer were added 272 grams of 4'-hydroxyacetophenone, 2,500 ml. of acetic acid, and 1,600 ml. of water. The stirred solution was chilled by immersion into an ice water bath and at 5° C. chlorine gas was added. The resulting 3',5'-dichloro-4'-hydroxyacetophenone weighing 362 grams (88.32 percent) was filtered and washed, and had a melting point of 160°–162° C. indicating that it was essentially pure 3',5'-dichloro-4'-hydroxyacetophenone. The product was further purified by recrystallizing from benzene.

Analysis calcd. for $C_8H_6Cl_2$: C, 47.05; H, 2.91; and Cl, 34.85. Found: C, 46.85; H, 2.94; and Cl, 35.07.

EXAMPLE 2

Preparation of 3',5'-dibromo-4'-hydroxyacetophenone

A three-liter, round bottom, four-neck flask, fitted with a condenser, mechanical stirrer, addition funnel, and thermometer was charged with 204.3 grams (1.5 moles) of 4'-hydroxyacetophenone and 1,050 grams of water. The mixture was warmed to 80° C. and 480 grams (3.0 moles) of bromine was added over a period of 2.66 hours while maintaining the temperature between 78 and 80° C. The reaction product at this stage was brown but after four additional hours of stirring, the product was almost white. The solid was separated by filtration and washed twice by reslurrying in water and filtration. The solid was airdried. The crude product weighted 403 grams and melted at 172°–176° C. The crude product recrystallized from benzene was crystalline and melted at 183°–184° C.

EXAMPLE 3

Preservation of Water-thinned Paint During Storage

In this example 3',5'-dichoro-4'-hydroxyacetophenone was added to a tung oil-modified acrylic latex paint (water-thinned) in an amount equal to 0.2 weight percent based on the total weight of the paint. After 24 hours, the paint was inoculated with a culture of Trichoderma species isolated from a contaminated paint. The paint was stored at 25° C. for 8 weeks. During this period, paint samples were removed at weekly intervals and streaked on petri dishes containing mycophil agar. No growth of the Trichoderma was noted. In a similar test in which no fungicide was added to the paint, considerable growth of Trichoderma was observed when the paint samples were subjected to the streaking test.

EXAMPLE 4

In this example the fungicidal effectiveness of various amounts of 3',5'-dichloro-4'-hydroxyacetophenone in (1) a tung oil-modified acrylic latex paint (water-thinned), and (2) a long-oil alkyd paint (solvent-thinned), was determined as compared to the control containing no fungicide. In this test a series of test panels were painted with compositions containing from 0 to 5 percent by weight of 3',5'-dichloro-4'-hydroxyacetophenone after which the panels were exposed outdoors for one year, some facing north and some south. The results are tabulated below, and show that from 1 to 5 percent inhibitor improves the panels with respect to fungal growth and also general appearance. The ratings are on the basis of a scale of 1 to 10 with 10 being the highest or best result.

Results for tung oil-modified acrylic paint containing different amounts of 3',5'-dichloro-4'-hydroxyacetophenone are tabulated below:

TABLE 1

| Exposure | Substrate | Inhibitor Percent | Mold | General appearance |
|---|---|---|---|---|
| N | Pine | 0.0 | 8 | 7 |
|   |   | 1.0 | 8+ |   |
|   |   | 3.0 | 9 | 9 |

TABLE 1-continued

| Exposure | Substrate | Inhibitor Percent | Mold | General appearance |
|---|---|---|---|---|
|  |  | 5.0 | 9 | 9 |
| S | Pine | 0.0 | 8 | 7 |
|  |  | 1.0 | 8+ | 8+ |
|  |  | 3.0 | 9 | 9 |
|  |  | 5.0 | 9 | 9 |
| N | Cedar | 0.0 | 8 | 7 |
|  |  | 1.0 | 8+ | 8+ |
|  |  | 3.0 | 9 | 9 |
|  |  | 5.0 | 9 | 9 |
| S | Cedar | 0.0 | 8 | 7 |
|  |  | 1.0 | 8+ | 8+ |
|  |  | 3.0 | 9 | 9 |
|  |  | 5.0 | 9 | 9 |

Results for long-oil alkyd solvent-thinned paints are similarly tabulated below:

TABLE 2

| Exposure | Substrate | Inhibitor Percent | Mold | General appearance |
|---|---|---|---|---|
| N | Pine | 0.0 | 4 | 2 |
|  |  | 1.0 | 6 | 7 |
|  |  | 3.0 | 7 | 8 |
|  |  | 5.0 | 8+ | 9 |
| S | Pine | 0.0 | 4 | 2 |
|  |  | 1.0 | 6 | 7 |
|  |  | 3.0 | 7 | 8 |
|  |  | 5.0 | 8+ | 9 |
| N | Cedar | 0.0 | 4 | 2 |
|  |  | 1.0 | 6 | 7 |
|  |  | 3.0 | 7 | 8 |
|  |  | 5.0 | 8+ | 9 |
| S | Cedar | 0.0 | 4 | 2 |
|  |  | 1.0 | 6 | 7 |
|  |  | 3.0 | 7 | 8 |
|  |  | 5.0 | 8+ | 9 |

EXAMPLE 5

The same two paint samples as described in Example 4 were treated with 5 percent of 3',5'-dibromo-4'-hydroxyacetophenone and with 5 percent of 3',5'-dichloro-4'-hydroxyacetophenone. Test panels were prepared and exposed in a tropical chamber for 30 days. Panels which had been painted with untreated controls were covered with a heavy mold growth. The panels painted with the two paints treated with 3',5'-dichloro-4'-hydroxyacetophenone were free of any mold growth and the panels painted with two paints treated with 3',5'-dirbomo-4'-hydroxyacetophenone had a very slight mold growth on the surfaces.

EXAMPLE 6

The effect of 3',5'-dibromo- and 3',5'-dichloro-4'-hydroxyacetophenone on three fungi, Aspergillus niger, Penicillium roqueforti, and Chaetomium globosum, was determined in this example. The pulp-substrate method described in U.S. Pat. No. 3,193,448, which disclosure is hereby made a part of this application, was utilized for these tests.

The period of observation was 14 days. Growth was recorded after each period on the basis of the following key:

4 = excellent
3 = good
2 = poor
1 = very poor, scant, questionable
0 = no growth The results are summarized in Table 3.

TABLE 3

Inhibition of Aspergillus niger, Penicillium roqueforti, and Chaetomium globosum by 3',5'-dibromo- and 3',5'-dichloro-4'-hydroxyacetophenone in a pulp-substrate method after 14 days incubation

| Test organism | Concentration Parts per million | Growth observed 3',5'-dibromo-4'-hydroxyacetophenone | 3',5'-dichloro-4'-hydroxyacetophenone |
|---|---|---|---|
| Aspergillus niger | 50 | 4 | 4 |
|  | 100 | 4 | 4 |
|  | 200 | 0 | 0 |
| Penicillium roqueforti | 50 | 4 | 4 |
|  | 100 | 4 | 4 |
|  | 200 | 0 | 0 |
| Chaetomium globosum | 50 | 0 | 0 |
|  | 100 | 0 | 0 |
|  | 200 | 0 | 0 |

EXAMPLE 7

In this example the effectiveness of 3',5'-dichloro-4'-hydroxyacetophenone as a fungicide to prevent deterioration of stored wood chips was determined. In the test treated and untreated fresh quaking aspen (Populus tremuloides Michx.) chips were placed in a paired set of polystyrene foam boxes which had an internal volume of 3.9 cubic feet. Each box was slowly fed with water-saturated air, about 3.9 cubic feet per day. After a storage period sufficient to allow deterioration that could be evaluated, the boxes were opened and their contents visually compared for chip brightness and the presence of microorganisms. The procedure followed was that described by E. L. Springer, W. E. Eslyn, L. L. Zoch, Jr., and G. J. Hajny, in "Control of Pulp Chip Deterioration with Kraft Green Liquor" (USDA Forest Serv. Res. Pap. FPL 110, Forest Prod. Lab., Madison, Wis. 53705, 1969).

The chips, contained in nylon mesh bags, were soaked in an aqueous dispersion containing 3',5'-dichloro-4'-dichloro-4'-hydroxyacetophenone for 10 minutes, then allowed to drain for two hours before being placed in the polystyrene foam boxes. Based on the weight gain of the chips after drainage and the moisture content of the fresh wood, the chemical pickup was calculated to be one pound of 3',5'-dichloro-4'-hydroxyacetophenone per ton of ovendry wood. The control chips were soaked in tap water for 10 minutes, and also allowed to drain for 2 hours.

When the boxes were opened after 97 days, the water-soaked chips had darkened appreciably, and were covered with various types of microorganisms. The predominant microorganism was a fungus (Trichoderma sp.) that covered the surface of many chips with a white mycelial growth. The treated chips were free of microorganisms, and appeared fresh and bright.

EXAMPLE 8

This example is concerned with a lap pulp preservation test which simulates the conditions prevailing during the storage of moist groundwood lap pulp stock in pulp and paper mills.

The lap pulp preservation tests were conducted upon a pulp substrate consisting of specimens of spruce lap pulp which weigh 2.5 ± 0.1 grams each on an ovendry basis and measured approximately 6 cm. × 6 cm. Each test specimen was placed into a sterilized glass petri dish and the following sequence of operations performed in duplicate for various concentrations of the compound of this invention, 3',5'-dichloro-4'-hydroxyacetophenone.

1. A suitable amount of mineral salts was introduced into each test specimen of ovendry lap pulp by uniformly distributing 2.0 ml. of the following solution over the test specimen:

|  | Grams |
| --- | --- |
| Ammonium nitrate | 3.0 |
| Dipotassium phosphate | 1.0 |
| Potassium chloride | 0.25 |
| Magnesium sulfate | 0.25 |
| Polyoxyethylene derivative of sorbitan monooleate | 0.5 |
| Demineralized water | 1,000 ml. |

After the test specimens were uniformly wetted, the entire series of specimens was dried in an oven at 105° C. for 1 hour. The petri dish covers were left partially open to facilitate drying.

2. Two milliliters of a water dispersion containing the 3',5'-dichloro-4'-hydroxyacetophenone was applied to the test specimen so as to provide the desired concentration in the test specimen. Untreated control specimens were prepared in duplicate by adding 2.0 ml. of sterile water instead of the aqueous dispersion of the compound being tested.

3. The final addition to each test specimen was that of the inoculum, which contained 0.5 gram (0.5 ml.) of water. The pulp specimens thus contained 50 percent water and 50 percent pulp. The inoculum was prepared in the following manner. With the fungi *Aspergillus niger*, *Chaetomium globosum*, and *Penicillium roqueforti*, suitable spore suspensions were readily obtained from mycophil or malt agar tube slants which were added carefully to the upper side of the prepared test specimens of lap pulp.

4. A tight-fitting wide rubber band was then placed over each petri dish with its inoculated lap pulp specimen to minimize the loss of moisture from the specimen during the incubation. The temperature of incubation was 28 to 30° C.

The results are summarized in Table 4 wherein the numerical values 0 to 4 have the same meaning as in Example 6.

TABLE 4

Inhibition of *Aspergillus niger*, *Penicillium roqueforti*, and *Chaetomium globosum* by 3',5'-dichloro-4'-hydroxyacetophenone in a lap pulp method after 14 days incubation

| Test organism | Concentration Parts per million | Growth observed |
| --- | --- | --- |
| *Aspergillus niger* | | |
| | 50 | 4 |
| | 75 | 4 |
| | 100 | 4 |
| | 150 | 1 |
| | 200 | 0 |
| | 300 | 0 |
| *Penicillium roqueforti* | 10 | 1 |
| | 25 | 0 |
| | 50 | 0 |
| | 75 | 0 |
| | 100 | 0 |
| | 150 | 0 |
| | 200 | 0 |
| *Chaetomium globosum* | 10 | 2 |
| | 25 | 3 |
| | 50 | 0 |
| | 75 | 0 |
| | 100 | 0 |
| | 200 | 0 |

EXAMPLE 9

Mold Control During Leather Manufacture

In this example, the effectiveness of 3',5'-dichloro-4'-hydroxyacetophenone as a fungicide in the manufacture of leather by the vegetable and chrome-tanning processes was determined. The fungicide was used at a concentration of 0 (control), 0.2 pounds, and 0.3 pounds per 1,000 pounds of vegetable tanning stock. After tanning and rinsing, the samples were allowed to drain thoroughly and were then stored in closed plastic bags, each being individually marked. Visual observations were made periodically during the storage period. Considerable fungal growth was noted on the control sample, while the two fungicide-treated samples were practically free of fungal growth.

Similar results were obtained when the fungicide was used in the chrome-tanning process.

EXAMPLE 10

Preservation of Leather Finishes

In this example we found that 3',5'-dichloro-4'-hydroxyacetophenone is an excellent fungicide for the preservation of leather finishes. When 3',5'-dichloro-4'-hydroxyacetophenone was added directly to the leather finishing material at a concentration of 0.2 weight percent based on the total weight of the finishing material, fungal growth was reduced to substantially zero. Furthermore, we have found that this fungicide is compatible with all typical leather finishing compositions.

EXAMPLE 11

Mold Resistant Leather

Imparting mold resistance to leather and to items made from leather usually is a multi-step procedure. The specific end use of the leather and the type of mold resistance properties required govern the procedures used to apply the mold resistant agent. One or more of the treatment steps are necessary to develop mold resistance in the tanned leather. These steps are:

1. Topical application of preservation to hide following vegetable or chrome tanning, retanning, or reverse retanning stages. Effective mold resistant leather was obtained when 3',5'-dichloro-4'-hydroxyacetophenone was applied to tanned hides at a concentration of 0.5 to 1.5 weight percent based on the dried weight of the tanned leather. As to the method of application, the 3',5'-dichloro-4'-hydroxyacetophenone is applied to the surface of the stock as a uniform spray application or preferably with an applicator roll while the hides are still wet. When subsequent steps involving the application of additional preservative are employed, the lower level of the fungicide was sufficient. When no other processing of the leather is done, the higher application rates have been required to impart mold resistant properties to the final item.

2. To provide mold resistant properties to leather that is fatliquored, the preservative must be applied during the fatliquoring stage. Once fatliquoring is completed, the leather is highly resistant to the penetration of topically applied preservatives.

The 3',5'-dichloro-4'-hydroxyacetophenone may be combined with the fatliquor either during compounding of the fatliquor or during the fatliquoring sequence at concentrations varying from 0.5 to 1.5 percent based on the total weight of the fatliquor, with which it is compatible. Not only has this resulted in developing mold resistant properties in the leather, but it has eliminated undesirable odors in the fatliquor and finished leather, reduced leather cracking, improved workability and penetration of fatliquor into leather, and reduced discoloration and staining of the leather.

3. Even though the leather stock is adequately protected against growth of microorganisms, the finished leather item is still subjected to deterioration caused by fungi. This is a result of fungi growing on the leather finishes applied after tanning to the surface of the leather. To provide "total mold resistance", it is usually necessary to include a preservative in the finish formulation. We have found that 3',5'-dichloro-4'-hydroxyacetophenone is an preservative for this purpose when it is combined with leather finishing materials at a concentration of 0.5 to 1.5 percent based on the weight of the finish. When the finishing material composition is carbohydrate, the lower concentration of the fungicide is sufficient. When the finish is composed primarily of protein substances, the higher concentrations are generally necessary to impart mold resistance to the finished item.

EXAMPLE 12

Preservation of Plastic Sheets

The effectiveness of 3',5'-dichloro-4'-hydroxyacetophenone as a fungicide when incorporated into a polyvinyl chloride (PVC) plastic sheet was determined as follows: A composition was prepared containing 100 parts of PVC resin, 50 parts of dioctyl phthalate plasticizer, 3 parts of metal stabilizer, and 0.25 parts of stearic acid lubricant, wherein parts are parts by weight. After thoroughly mixing the components, the resulting composition was divided into two equal samples. To one sample was added 0.6 parts by weight of 3',5'-dichloro-4'-hydroxyacetophenone; and nothing was added to the other sample which was used as a control. After dry blending, the two samples were fused and formed into sheets or films having a thickness of 0.007 inch.

The two films were then subjected to identical exposure conditions, vertical north, at Memphis, Tennessee for a period of 14 months. At the end of this period, mold growth on the two film samples was recorded on the basis of the following key:
 10 = no mold growth
 0 = very heavy mold growth
The results were as follows:

| | |
|---|---|
| Control | 6 |
| Film containing the fungicide | 9.5 |

EXAMPLE 13

Similar beneficial results were obtained when 3',5'-dichloro-4'-hydroxyacetophenone was incorporated into alkyd resins, epoxy resins, polyester resins, polyurethane, cellulosic polymers, and acrylic polymers in the amounts and following the procedure as disclosed in Example 12.

The 3',5'-dihalo-4'-hydroxyacetophenone may be used diluted with a carrier which may be liquid or solid. Dusts may be prepared with a finely divided solid such as talc, clay, pyrophyllite, diatomaceous earth, hydrated silica, calcium silicate, or magnesium carbonate. If desired, wetting and/or dispersing agents may be used. When the proportions of these are increased, there results a wettable powder, which may be taken up in water and applied from a spray.

Dusts may contain 1 percent to 15 percent of 3',5'-dihalo-4'-hydroxyacetophenone, while wettable powders may contain up to 50 percent or more of 3',5'-dihalo-4'-hydroxyacetophenone.

A typical formulation of a wettable powder comprises 20 percent to 50 percent of 3',5'-dihalo-4'-hydroxyacetophenone, 45 to 75 percent of one or more finely divided solids, 1 percent to 5 percent of a wetting agent, and 1 percent to 5 percent of a dispersing agent. Typical wetting agents include sodium dodecyl sulfate, sodium nonylbenzene sulfonate, sodium dioctyl sulfosuccinate, octylphenoxypolyethoxyethanol, or other nonionic agents, such as the ethylene and/or propylene oxide condensates with long-chained alcohols, mercaptans, amines, or carboxylic acids. Typical dispersing agents include the sodium sulfonate of condensed naphthalene-formaldehyde and lignin sulfonates.

Liquid concentrates may also be used. These are prepared by taking up 3',5'-dihalo-4'-hydroxyacetophenone in an organic solvent together with one or more surface active agents. For example, there may be mixed 25 parts of 3',5'-dihalo-4'-hydroxyacetophenone, 5 parts of a surface-active solvent-soluble alkylphenoxypolyethoxyethanol and 70 parts of one or more solvents, such as dimethyl sulfoxide or dimethylformamide, or mixtures of these with xylene or other aromatic solvents.

The compounds of this invention, 3',5'-dihalo-4'-hydroxyacetophenone, may be used in conjunction with other fungicidal agents and also in conjunction with miticides or insecticides or other pesticides.

While particular embodiments of the invention have been described, it will be understood, of course, that the invention is not limited thereto since many modifications may be made thereof. It is, therefore, contemplated to cover by the appended claims any such modifications as fall within the true spirit and scope of the invention.

The invention having thus been described, what is claimed and desired to be secured by Letters Patent is:

1. A method of inhibiting fungal deterioration of an organic substance that is susceptible to deterioration by the growth and proliferation of fungi, which comprises adding a 3',5'-dihalo-4'-hydroxyacetophenone to said organic substance in an amount sufficient to inhibit the growth and proliferation of said fungi.

2. The method of claim 1 wherein the organic substance is a water-thinned paint.

3. The method of claim 1 wherein the organic substance is a dried film obtained from a water-thinned paint.

4. The method of claim 1 wherein the organic substance is a dried film obtained from a solvent-thinned paint.

5. The method of claim 1 wherein the organic substance is a carbohydrate.

6. The method of claim 1 wherein the organic substance is wood.

7. The method of claim 1 wherein the organic substance is wood chips.

8. The method of claim 1 wherein the organic substance is wood pulp.

9. The method of claim 1 wherein the organic substance is paper or paperboard.

10. The method of claim 1 wherein the organic substance is a proteinaceous substance.

11. The method of claim 1 wherein the organic substance is an animal hide.

12. The method of claim 1 wherein the organic substance is leather.

13. The method of claim 1 wherein the organic substance is a polymeric organic composition.

14. The method of claim 1 wherein the organic substance is an alkyd resin.

15. The method of claim 1 wherein the organic substance is epoxy resin.

16. The method of claim 1 wherein the organic substance is polyester resin.

17. The method of claim 1 wherein the organic substance is polyurethane.

18. The method of claim 1 wherein the organic substance is polyvinyl chloride resin.

19. The method of claim 1 wherein the organic substance is cellulosic polymer.

20. The method of claim 1 wherein the organic substance is acrylic polymer.

21. The method of claim 1 wherein the 3',5'-dihalo-4'-hydroxyacetophenone is 3',5'-dibromo-4'-hydroxyacetophenone.

22. The method of claim 21 wherein the organic substance is a water-thinned paint.

23. The method of claim 21 wherein the organic substance is a dried film obtained from a water-thinned paint.

24. The method of claim 21 wherein the organic substance is a dried film obtained from a solvent-thinned paint.

25. The method of claim 21 wherein the organic substance is a carbohydrate.

26. The method of claim 21 wherein the organic substance is wood.

27. The method of claim 21 wherein the organic substance is wood chips.

28. The method of claim 21 wherein the organic substance is wood pulp.

29. The method of claim 21 wherein the organic substance is paper or paperboard.

30. The method of claim 21 wherein the organic substance is a proteinaceous substance.

31. The method of claim 21 wherein the organic substance is an animal hide.

32. The method of claim 21 wherein the organic substance is leather.

33. The method of claim 21 wherein the organic substance is a polymeric organic composition.

34. The method of claim 21 wherein the organic substance is alkyd resin.

35. The method of claim 21 wherein the organic substance is epoxy resin.

36. The method of claim 21 wherein the organic substance is polyester resin.

37. The method of claim 21 wherein the organic substance is polyurethane.

38. The method of claim 21 wherein the organic substance is polyvinyl chloride resin.

39. The method of claim 21 wherein the organic substance is cellulosic polymer.

40. The method of claim 21 wherein the organic substance is acrylic polymer.

41. The method of claim 1 wherein the 3',5'-dihalo-4'-hydroxyacetophenone is 3',5'-dichloro-4'-hydroxyacetophenone.

42. The method of claim 41 wherein the organic substance is a water-thinned paint.

43. The method of claim 41 wherein the organic substance is a dried film obtained from a water-thinned paint.

44. The method of claim 41 wherein the organic substance is a dried film obtained from a solvent-thinned paint.

45. The method of claim 41 wherein the organic substance is a carbohydrate.

46. The method of claim 41 wherein the organic substance is wood.

47. The method of claim 41 wherein the organic substance is wood chips.

48. The method of claim 41 wherein the organic substance is wood pulp.

49. The method of claim 41 wherein the organic substance is paper or paperboard.

50. The method of claim 41 wherein the organic substance is a proteinaceous substance.

51. The method of claim 41 wherein the organic substance is an animal hide.

52. The method of claim 41 wherein the organic substance is leather.

53. The method of claim 41 wherein the organic substance is a polymeric organic composition.

54. The method of claim 41 wherein the organic substance is alkyd resin.

55. The method of claim 41 wherein the organic substance is epoxy resin.

56. The method of claim 41 wherein the organic substance is polyester resin.

57. The method of claim 41 wherein the organic substance is polyurethane.

58. The method of claim 41 wherein the organic substance is polyvinyl chloride resin.

59. The method of claim 41 wherein the organic substance is cellulosic polymer.

60. The method of claim 41 wherein the organic substance is acrylic polymer.

* * * * *